(12) United States Patent
Lu et al.

(10) Patent No.: US 12,368,534 B2
(45) Date of Patent: Jul. 22, 2025

(54) DATA TRANSMISSION METHOD AND NETWORK DEVICE

(71) Applicant: HUAWEI TECHNOLOGIES CO., LTD., Guangdong (CN)

(72) Inventors: Yuchun Lu, Beijing (CN); Lin Ma, Shenzhen (CN); Liang Li, Beijing (CN); Yan Zhuang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 351 days.

(21) Appl. No.: 17/965,916

(22) Filed: Oct. 14, 2022

(65) Prior Publication Data

US 2023/0034209 A1    Feb. 2, 2023

Related U.S. Application Data

(63) Continuation of application No. PCT/CN2021/082882, filed on Mar. 25, 2021.

(30) Foreign Application Priority Data

Apr. 15, 2020    (CN) .......................... 202010294665.3

(51) Int. Cl.
*H04L 1/1607* (2023.01)
*H04L 1/00* (2006.01)
*H04L 1/08* (2006.01)

(52) U.S. Cl.
CPC .......... *H04L 1/1642* (2013.01); *H04L 1/0061* (2013.01); *H04L 1/08* (2013.01)

(58) Field of Classification Search
CPC ........ H04L 1/1642; H04L 1/0061; H04L 1/08
See application file for complete search history.

(56) References Cited

U.S. PATENT DOCUMENTS

| | | | |
|---|---|---|---|
| 2007/0116055 A1* | 5/2007 | Atsumi ................. | H04J 3/1658 370/476 |
| 2017/0310591 A1* | 10/2017 | Seo ......................... | H04L 45/66 |
| 2022/0231971 A1* | 7/2022 | Liu .......................... | H04L 47/36 |

FOREIGN PATENT DOCUMENTS

| | | |
|---|---|---|
| CN | 103973414 A | 8/2014 |
| WO | 2015006640 A1 | 1/2015 |

* cited by examiner

*Primary Examiner* — Benjamin H Elliott, IV
*Assistant Examiner* — Tracy Lauren Colbert
(74) *Attorney, Agent, or Firm* — WOMBLE BOND DICKINSON (US) LLP

(57) ABSTRACT

A data transmission method and a network device are provided. The method includes: obtaining a to-be-transmitted first MAC packet; obtaining a first data control subframe by using field space of a first field of the first MAC packet, and obtaining a first target data subframe based on a second field of the first MAC packet, where the first data control subframe includes a sequence number of the first target data subframe; and transmitting a first frame including the first data control subframe and the first target data subframe to a target network device. A source network device uses space of the first field to generate the first data control subframe used for retransmission control.

17 Claims, 11 Drawing Sheets

| Preamble (7B) | Delimiter (1B) | Destination address (6B) | Source address (6B) | Type/Length (2B) | Load | Frame check sequence (4B) | Interframe gap (12B) |

FIG. 3

DATA TRANSMISSION METHOD AND NETWORK DEVICE

CROSS-REFERENCE TO RELATED APPLICATIONS

This application is a continuation of International Application No. PCT/CN2021/082882, filed on Mar. 25, 2021, which claims priority to Chinese Patent Application No. 202010294665.3, filed on Apr. 15, 2020. The disclosures of the aforementioned applications are hereby incorporated by reference in their entireties.

TECHNICAL FIELD

This application relates to the communication field, and in particular, to a data transmission method and a network device.

BACKGROUND

With evolution of an Ethernet standard, a link rate continuously increases. In an era of 400-gigabit Ethernet (GE), 800-gigabit Ethernet (GE), and future 1.6-terabit Ethernet (TE), a rate of a single link increases to 100+ Gbps. Consequently, an introduced link loss further increases. In existing 100 GE and 400 GE Ethernet standards, forward error correction (FEC) is used to reduce a link bit error rate. The FEC is a channel coding algorithm in which redundant data is added to recover a lost data packet, and a transmit end performs FEC coding on payload data to generate a check data packet. A combination of the payload data and the check data packet is referred to as an FEC data block. A ratio of a quantity of payload data packets to a quantity of check data packets is fixed. The transmit end transmits the FEC data block. After receiving the FEC data block, a receive end recovers a lost or wrong data packet by using the check data packet and the payload data packet.

However, when the link rate is further increased, an existing FEC solution faces a risk of an insufficient gain capability. For this risk, an error correction capability of FEC may be improved by increasing the quantity of check data packets, which inevitably increases link overheads and computational complexity.

In a high-speed Ethernet era, effectively reducing a link bit error rate without increasing link overheads and computational complexity is an urgent problem to be resolved.

SUMMARY

Embodiments of this application provide a data transmission method and a network device. The transmission method is applied to an Ethernet communication system. The Ethernet communication system includes a source network device and a target network device. The source network device and the target network device each are a device having an Ethernet interface, for example, a switch, a router, a server, or a personal computer (PC). The source network device and the target network device are communicatively connected. In this application, an automatic repeat-request (ARQ) mechanism is introduced into an Ethernet architecture, to effectively reduce a link bit error rate by using a retransmission mechanism.

According to a first aspect, an embodiment of this application provides a data transmission method, where the method is applied to a source network device. The method includes the following operations: obtaining a to-be-transmitted first MAC packet, where the first MAC packet includes a first field and a second field; generating a first frame, where the first frame includes a first data control subframe obtained by using field space of the first field and a first target data subframe obtained based on the second field, the first data control subframe is used for retransmission control, the first target data subframe is used to carry to-be-transmitted valid data, and the first data control subframe includes a sequence number of the first target data subframe; and transmitting, by the source network device, the first frame to a target network device. When the target network device fails to receive the first frame, the target network device feeds back the sequence number of the first target data subframe to the source network device, and the source network device retransmits the first frame, to reduce a link bit error rate. In this application, the source network device uses space of the first field of the first MAC packet obtained from an upper layer to generate the first data control subframe used for retransmission control. In this way, there is no additional overhead, a structure of each layer in an Ethernet architecture does not need to be modified, and the link bit error rate is effectively reduced by using a retransmission mechanism in a case of compatibility with an Ethernet standard.

In one embodiment, the first field includes a preamble field and a SFD field, and the generating a first frame may include: modifying the first MAC packet, generating the first data control subframe by using partial or entire space of the preamble field and the SFD field, and generating the first target data subframe based on the second field; and encapsulating the first data control subframe and the first target data subframe to obtain the first frame. In this embodiment, the first data control subframe is generated by using the partial or entire space of the preamble field and the SFD field in the MAC packet. In this way, there is no additional overhead.

In one embodiment, a first byte to an $N^{th}$ byte of a first preamble field and the SFD field in the first MAC packet are used as a second preamble field, where N is an integer greater than or equal to 1 and less than 8. For example, N is 1 or 2. The first data control subframe is generated by using field space other than the second preamble field in the first field; and then the second preamble field, the first data control subframe, and the first target data subframe are encapsulated to obtain the first frame. In this embodiment, the first data control subframe is generated by using partial field space of the first preamble field and the SFD field in the first MAC packet, and first N bytes in the first preamble field in the first MAC packet are used as the second preamble field in the first frame, where a value of the second preamble field may be used to recover a value of the first preamble field in the first MAC packet.

In one embodiment, the second field in the first MAC packet includes a destination MAC address field, a source MAC address field, a type or length field, a payload field, and a frame check sequence field.

In one embodiment, the first target data subframe further includes a first check field, the first data control subframe includes a second check field, the second check field may be a cyclic redundancy check (CRC) field, and the second check field is a frame check sequence (FCS) field; and a value of the first check field is used by the target network device to verify whether the first MAC packet has a bit error, and a value of the second check field is used by the target network device to verify whether the first data control subframe has a bit error. In this embodiment, the first check field and the second check field may be used by the target network device to determine whether the first frame is successfully received. When neither the first data control subframe nor the first MAC packet has a bit error, it may be determined that the first frame is successfully received, thereby improving accuracy of verifying whether the first frame is successfully received.

In one embodiment, after the transmitting the first frame to a target network device, the method may further include the following operations: receiving a second frame transmitted by the target network device, where the second frame includes a second data control subframe used for retransmission control, and the second data control subframe includes a type field and a load field; parsing the second data control subframe to obtain data in the second data control subframe, and identifying a value of the type field and a value of the load field in the second data control subframe; if the value of the type field of the second data control subframe is a non-acknowledged identifier, and the load field of the second data control subframe carries the sequence number that is of the first target data subframe and that corresponds to the non-acknowledged identifier, fetching the first frame in a retransmission buffer based on the sequence number that is of the first target data subframe and that corresponds to the non-acknowledged identifier; and retransmitting, by the source network device, the first frame to the target network device, to reduce a bit error rate; or if the value of the type field of the second data control subframe is an acknowledged identifier, and the load field of the second data control subframe carries the sequence number that is of the first target data subframe and that corresponds to the acknowledged identifier, indicating, by the acknowledged identifier, that the target network device successfully receives the first frame. In this embodiment, the source network device receives the second frame transmitted by the target network device, where the second frame includes the second data control subframe, and the second data control subframe may be used to feed back a receiving status of the first target data subframe. If the value of the type field of the second data control subframe is a non-acknowledged identifier, it indicates that the target network device fails to receive the first frame. In this case, the source network device retransmits the first frame to the target network device to reduce the bit error rate.

In one embodiment, the second frame further includes a second target data subframe, a format of the second target data subframe is the same as a format of the first target data subframe, the second target data subframe includes valid data transmitted by the target network device to the source network device, and the source network device may learn of a first frame receiving status of the target network device by using the second data control subframe. In addition, the received second target data subframe may be recovered, and the second data control subframe and a second preamble field in the second frame are replaced with a first preamble field and a SFD field based on a frame format of a MAC layer, to obtain a MAC packet; and the MAC packet is transmitted to the MAC layer for processing. In this embodiment, although the second data control subframe used for retransmission control is added, transmission of valid data between the source network device and the target network device is not affected, and there is no additional overhead.

In one embodiment, the second frame includes a second target data subframe, and the second data control subframe carries, by using the load field, a sequence number corresponding to the second target data subframe. The sequence number corresponding to the second target data subframe is used by the target network device to retransmit the second frame based on the sequence number if the source network device fails to receive the second frame.

In one embodiment, the second data control subframe further includes a header field, where the header field of the second data control subframe is used to indicate whether the source network device needs to feed back a receiving status of the second target data subframe to the target network device. In some scenarios, some data has a low requirement for quality of service (QoS) of an interface and does not need to be retransmitted. The header field may be used to indicate that a peer end does not need to feed back the receiving status of the second target data subframe, thereby effectively reducing a retransmission probability, and saving a transmission resource.

In one embodiment, the first data control subframe further includes a header field, where the header field of the first data control subframe is used to indicate whether the target network device needs to feed back a receiving status of the first target data subframe to the source network device.

In one embodiment, retransmission control is performed based on a transmission level of data. Data with a high priority has a high QoS requirement, data with a low priority has a low QoS requirement, and whether transmitted data is retransmitted is distinguished based on a QoS requirement. If a transmission level of the first target data subframe is a low priority, it is determined that the header field of the first data control subframe carries a first identifier, where the first identifier is used to indicate that the target network device does not need to feed back the receiving status of the first target data subframe to the source network device; or if the transmission level of the first target data subframe is a high priority, it is determined that the header field of the first data control subframe carries a second identifier, where the second identifier is used to indicate that the target network device needs to feed back the receiving status of the first target data subframe to the source network device. In this embodiment, for Ethernet data, not all data requires lossless transmission. Therefore, ARQ retransmission control may not be performed on all data, and retransmission control may be performed on only data with a high priority. In this way, the retransmission probability can be effectively reduced, there is no need to buffer all packets, and only the data with a high priority needs to be buffered. In this way, a storage capacity for data buffering can be greatly reduced, to reduce a pressure on a chip area.

According to a second aspect, an embodiment of this application provides a data transmission method, where the method is applied to a target network device. The method includes: receiving a first frame transmitted by a source network device, where the first frame includes a first data control subframe and a first target data subframe, the first data control subframe is generated by using field space of a first field of a first MAC packet obtained from an upper layer, the first target data subframe is generated based on a second field of the first MAC packet, and the first data control subframe carries a sequence number corresponding to the first target data subframe. In this embodiment of this application, the first data control subframe is obtained by using space of the first field of the MAC packet, and the first target data subframe is obtained by using space of the second field of the first MAC packet. A structure of the first data control subframe and a structure of the first target data subframe are compatible with an Ethernet architecture, the first data control subframe does not introduce an additional overhead, and the first data control subframe includes the sequence number of the first target data subframe. The first frame transmitted by the source network device is received.

When the target network device fails to receive the first frame, the target network device feeds back the sequence number of the first target data subframe to the source network device, and the source network device retransmits the first frame, to reduce a link bit error rate. In this application, the source network device generates, by using the space of the first field of the first MAC packet obtained from the upper layer, the first data control subframe used for retransmission control. In this way, there is no additional overhead, a structure of each layer in the Ethernet architecture does not need to be modified, and the link bit error rate is effectively reduced by using a retransmission mechanism in a case of compatibility with an Ethernet standard.

In one embodiment, after the receiving a first frame transmitted by a source network device, the method may further include: generating a second frame, where the second frame also includes a second data control subframe used for retransmission control, and if the first frame is not successfully received, the second data control subframe carries a non-acknowledged identifier by using a type field and carries, by using a load field, the sequence number that is of the first target data subframe and that corresponds to the non-acknowledged identifier, or if the first frame is successfully received, the second data control subframe carries an acknowledged identifier by using the type field and carries, by using the load field, the sequence number that is of the first target data subframe and that corresponds to the acknowledged identifier; and transmitting the second frame to the source network device. In this embodiment, the target network device feeds back a receiving status of the first target data subframe by using the second data control subframe in the second frame.

In one embodiment, the second frame further includes a second target data subframe, and the second data control subframe carries a sequence number of the second target data subframe by using the load field. The sequence number corresponding to the second target data subframe is used by the target network device to retransmit the second frame based on the sequence number if the source network device fails to receive the second frame.

In one embodiment, the second frame further includes a second target data subframe, and the generating a second frame may include:
obtaining a second MAC packet from a MAC layer, and modifying the second MAC packet, where the second MAC packet includes a first field and a second field; generating the second data control subframe by using partial or entire field space of the first field; generating the second target data subframe based on the second field; and encapsulating the second data control subframe and the second target data subframe to obtain the second frame. In this embodiment, the second data control subframe is generated by using partial or entire space of a preamble field and a SFD field in the MAC packet. In this way, there is no additional overhead.

In one embodiment, the first field includes a preamble field and a SFD field. A first byte to an $N^{th}$ byte of a first preamble field and the SFD field in the second MAC packet are used as a second preamble field, where N is an integer greater than or equal to 1 and less than 8. The second data control subframe is generated by using field space other than the second preamble field in the first field; and then the second preamble field, the second data control subframe, and the second target data subframe are encapsulated to obtain the second frame. In this embodiment, the second data control subframe is generated by using partial field space of the first preamble field and the SFD field in the second MAC packet, and first N bytes in the first preamble field in the second MAC packet are used as the second preamble field in the second frame, where a value of the second preamble field may be used to recover a value of the first preamble field in the second MAC packet. In this way, there is no additional overhead.

In one embodiment, the second field includes a destination MAC address field, a source MAC address field, a type or length field, a payload field, and a frame check sequence field.

In one embodiment, the first target data subframe includes a first check field, and the first data control subframe includes a second check field. The method may further include: verifying, by using the first check field, whether the first MAC packet has a bit error; verifying, by using the second check field, whether the first data control subframe has a bit error; and if the first MAC packet has a bit error or the first data control subframe has a bit error, determining that the first frame is not successfully received; or if it is determined that neither the first MAC packet nor the first data control subframe has a bit error, determining that the first frame is successfully received.

In one embodiment, the second frame includes a second target data subframe, the second target data subframe includes a first check field, and the second data control subframe includes a second check field; and a value of the first check field is used by the source network device to verify whether the second MAC packet has a bit error, and a value of the second check field is used by the source network device to verify whether the second data control subframe has a bit error. If neither the second data control subframe nor the second MAC packet has a bit error, it is determined that the source network device successfully receives the second frame; or if the second data control subframe has a bit error or the second MAC packet has a bit error, it is determined that the source network device fails to receive the second frame.

In one embodiment, the first data control subframe further includes a header field, where a value of the header field of the first data control subframe is used to indicate whether the target network device needs to feed back a receiving status of the first target data subframe to the source network device. The method may further include: parsing data in the first data control subframe to obtain the value of the header field. If the value of the header field of the first data control subframe is a first identifier, the first identifier is used to indicate that the target network device does not need to feed back the receiving status of the first target data subframe to the source network device, and the type field of the second data control subframe is set to a preset value, for example, the preset value is all "0" or the preset value is all "1", that is, the type field of the second data control subframe does not need to carry an acknowledged identifier or a non-acknowledged identifier; or if the value of the header field of the first data control subframe is a second identifier, the second identifier is used to indicate that the target network device needs to feed back the receiving status of the first target data subframe to the source network device. The method further includes: further determining whether the first frame is successfully received, where if the first frame is successfully received, the type field of the second data control subframe carries an acknowledged identifier, or if the first frame is not successfully received, the type field of the second data control subframe carries a non-acknowledged identifier.

In one embodiment, the second data control subframe further includes a header field, where a value of the header field of the second data control subframe is used to indicate whether the source network device needs to feed back a receiving status of the second target data subframe to the target network device.

In one embodiment, before the generating a second frame, the method may further include the following operations: performing error correction processing on the first frame through forward error correction FEC; and if a bit error rate of the first frame is higher than a threshold, generating the second frame to perform retransmission control. In this embodiment, retransmission control is performed in a low bit error rate condition after FEC error correction. Performing retransmission control after FEC ensures that an input bit error rate of retransmission control logic is maintained at a low level, so that a retransmission probability can be effectively reduced, effective link utilization is ensured, and a delay introduced by retransmission can be further reduced to an extremely low level.

According to a third aspect, an embodiment of this application provides a network device. The network device has a function executed by the source network device in the foregoing method, or has a function executed by the target network device in the foregoing method. The function may be implemented by using hardware, or may be implemented by executing corresponding software by using hardware. The hardware or software includes one or more modules corresponding to the foregoing function.

According to a fourth aspect, an embodiment of this application provides a network device, including a processor, a memory, and an Ethernet interface. The processor, the memory, and the Ethernet interface are connected by using a bus, the memory is configured to store program instructions, and when a program or instructions are executed by the processor, the network device is enabled to perform the method in any one of the first aspect or the second aspect.

According to a fifth aspect, an embodiment of this application provides a computer-readable medium, configured to store a computer program or instructions. When the computer program or the instructions are executed, a computer is enabled to perform the method in any one of the first aspect or the second aspect.

According to a sixth aspect, this application provides a chip system. The chip system includes a processor, configured to support a network device to implement a function in the foregoing aspects, for example, transmitting or processing data and/or information in the foregoing methods. In one embodiment, the chip system further includes a memory. The memory is configured to store program instructions and data that are used for the network device. The chip system may include a chip, or may include a chip and another discrete device.

DESCRIPTION OF DRAWINGS

FIG. 3 is a schematic diagram of a structure of a MAC packet according to an embodiment of this application;

DESCRIPTION OF EMBODIMENTS

Figure 1:
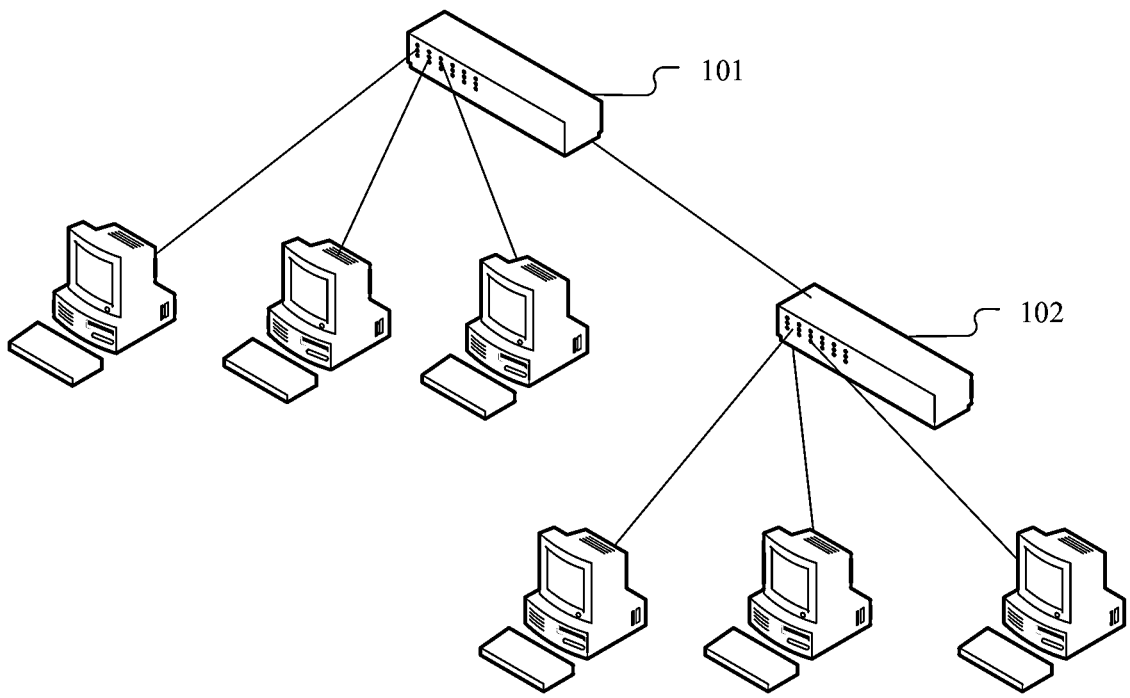
FIG. 1 is a schematic diagram of a scenario of an Ethernet communication system according to an embodiment of this application.

The following clearly describes technical solutions in embodiments of this application with reference to the accompanying drawings in embodiments of this application. It is clear that the described embodiments are merely some but not all of embodiments of this application. All other embodiments obtained by a person skilled in the art based on embodiments of this application without creative efforts shall fall within the protection scope of this application.

The term "and/or" appearing in this application may be an association relationship that describes associated objects, and indicates that there may be three relationships. For example, A and/or B may indicate that there are three cases: A exists alone, both A and B exist, and B exists alone. In addition, in this application, the character "/" usually indicates an "or" relationship between the associated objects.

The terms "first", "second", and the like in the specification, claims, and accompanying drawings of this application are used to distinguish between similar objects, and are not used to describe a specific sequence or order. It should be understood that data used in such a way are interchangeable in appropriate circumstances, so that embodiments described herein can be implemented in an order other than the content illustrated or described herein. In addition, the terms "include" and "have" and any variation thereof are intended to cover non-exclusive inclusion. For example, a process, method, system, product, or device that includes a series of operations or modules does not need to be limited to those clearly listed operations or modules, but may include other operations or modules that are not clearly listed or are inherent to the process, method, product, or device.

In an existing Ethernet architecture, error control is performed through FEC. With evolution of an Ethernet standard, a link rate continuously increases, and an FEC solution faces a case in which a gain capability is insufficient. In this application, an automatic repeat-request (ARQ) mechanism is introduced into an Ethernet architecture, to effectively reduce a link bit error rate by using a retransmission mechanism.

An embodiment of this application provides a data transmission method. The method may be applied to an Ethernet communication system. The Ethernet communication system includes a source network device and a target network device. The source network device and the target network device each are a device having an Ethernet interface. The source network device is connected to the target network device by using a cable. In one embodiment, the source network device may be understood as a transmit end (or a transmit end device), and the target network device may also be understood as a receive end (or a receive end device). The transmit end obtains a transmitted media access control (MAC) packet, and then modifies the MAC packet to generate a first frame. In one embodiment, the MAC packet includes a first field and a second field. The receive end generates, by using field space of the first field, a first data control subframe used for retransmission control, and generates, based on the second field, a first target data subframe used to carry a payload, where the first data control subframe includes a sequence number of the first target data subframe. The source network device transmits the first frame to the target network device. The target network device receives the first frame. If the target network device fails to receive the first frame, the target network device feeds back the sequence number of the first target data subframe to the source network device, and the source network device retransmits the first frame to the target network device. In this application, the transmit end generates the first data control subframe by using space of the first field of the MAC packet obtained from an upper layer. In this way, there is no additional overhead, a structure of each layer in an Ethernet architecture does not need to be modified, and a link bit error rate is effectively reduced by using a retransmission mechanism in a case of compatibility with an Ethernet standard.

It should be noted that the source network device and the target network device in this embodiment of this application may be various network communication devices that each have an Ethernet interface, for example, switches, routers, servers, or personal computers (PC). These network communication devices may alternatively be other hardware (for example, processors, memories, or various peripheral circuits) that has a network communication function. In addition to the network communication function, these communication devices further execute another function. For example, refer to FIG. 1. In an example scenario, both a source network device 101 and a target network device 102 are switches, the source network device 101 is connected to a plurality of terminal stations (for example, PCs), and the target network device 102 is connected to a plurality of terminal stations (for example, PCs). It should be noted that FIG. 1 merely shows an example scenario, and is not limited. Certainly, this embodiment of this application may be alternatively applied to another Ethernet scenario, for example, another application scenario in which the source network device may be a switch, and the target network device may be a PC.

To better understand this application, the nouns used in embodiments of this application are first explained.

Figure 2:
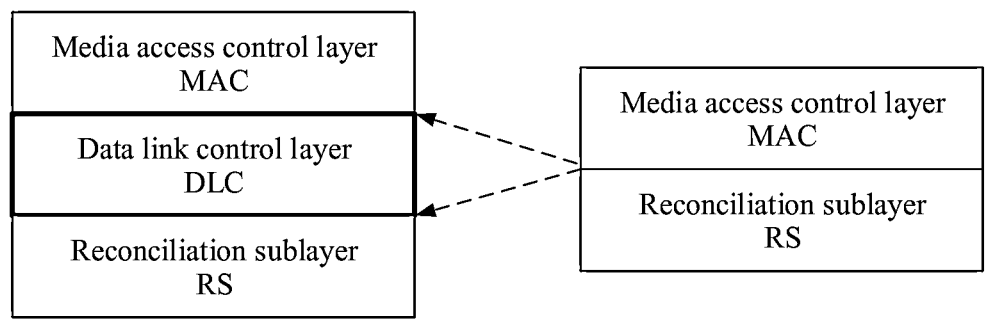
FIG. 2 is a schematic diagram of a location of a data link control layer according to an embodiment of this application.

(1) Data link control layer: A data link control layer is used for ARQ retransmission control. Refer to FIG. 2. The data link control (DLC) layer is introduced between a MAC layer and an RS layer, and a related operation of retransmission control is completed in this layer.

(2) MAC packet: A MAC packet is data of a MAC layer. Refer to FIG. 3. The MAC packet includes a preamble field (seven bytes), a start frame delimiter (SFD) field (one byte), a destination address (DA) field (six bytes), a source address (SA) field (six bytes), a type or length (length/type) field (two bytes), a payload field, a frame check sequence (FCS) field (four bytes), and an interframe gap (IFG) field (12 bytes). A function of each field is as follows: The preamble field is used to determine an arrival time of a frame and an amount of time between code bits (referred to as clock recovery), and is used for synchronous timing between a receive end and a transmit end. The SFD field is used to indicate start of a frame. The destination address field is used to receive a target node MAC address (also referred to as a destination MAC address) of a data frame. The source address field is used to transmit a source node MAC address (also referred to as a source MAC address) of a data frame. The type or length field may represent a length of a data field or represent a type of an upper layer protocol. The payload field is a valid data field. The frame check sequence field is used to check whether a MAC packet has a bit error. The interframe gap field indicates a time gap between two adjacent frames.

Figure 4:
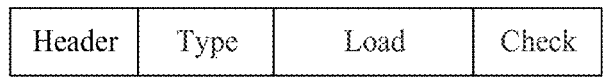
FIG. 4 is a schematic diagram of a structure of an example of a data control subframe according to an embodiment of this application.

(3) Data control subframe: a data frame that is generated at a data link control layer and that is used for retransmission control. In an example, refer to FIG. 4. The data control subframe may include a load field (for example, three bytes). In one embodiment, the data control subframe may further include at least one of a header field (for example, one byte), a type field (for example, one byte), or a check field (also referred to as a second check field in this application) (for example, one byte). A function of each field is as follows:

The load field may be used to indicate a sequence number corresponding to a target data subframe. In one embodiment, the load field is further used to indicate a sequence number corresponding to an acknowledged identifier or a non-acknowledged identifier.

The header field may be used to indicate whether a peer device needs to feed back a receiving status of the target data subframe.

The check field may be used to check whether the data control subframe has a bit error.

The type field may be used to carry an acknowledged (Ack) identifier or a non-acknowledged (Nak) identifier.

(4) Target data subframe: a data frame that is generated at a data link control layer and that is used to transmit a payload.

(5) Sequence number of a target data subframe: Each target data subframe has a sequence number, and the sequence number is used to distinguish the target data subframe based on a transmission sequence of the target data subframe. For example, the sequence number may be 1, 2, 3, or 4. Each time one target data subframe is transmitted, a corresponding sequence number is incremented by 1. For example, a sequence number of a transmitted first target data subframe is 1, a sequence number of a second target data subframe is 2, and a sequence number of a third target data subframe is 3. Certainly, the sequence number may be 1, 3, 5, 7, or the like, that is, each time one target data subframe is transmitted, a corresponding sequence number is incremented by 2. Alternatively, the sequence number may be defined based on a data volume. For example, a size of a first target data subframe is 10 bits, a sequence number of the first target data subframe is 10, a size of a second target data subframe is 10 bits, and these data volumes are accumulated, so that a sequence number of the second target data subframe is 20. It should be noted that a particular numbering manner of the sequence number is not limited, provided that a sequence of transmitting the target data subframe can be distinguished.

Figure 5:
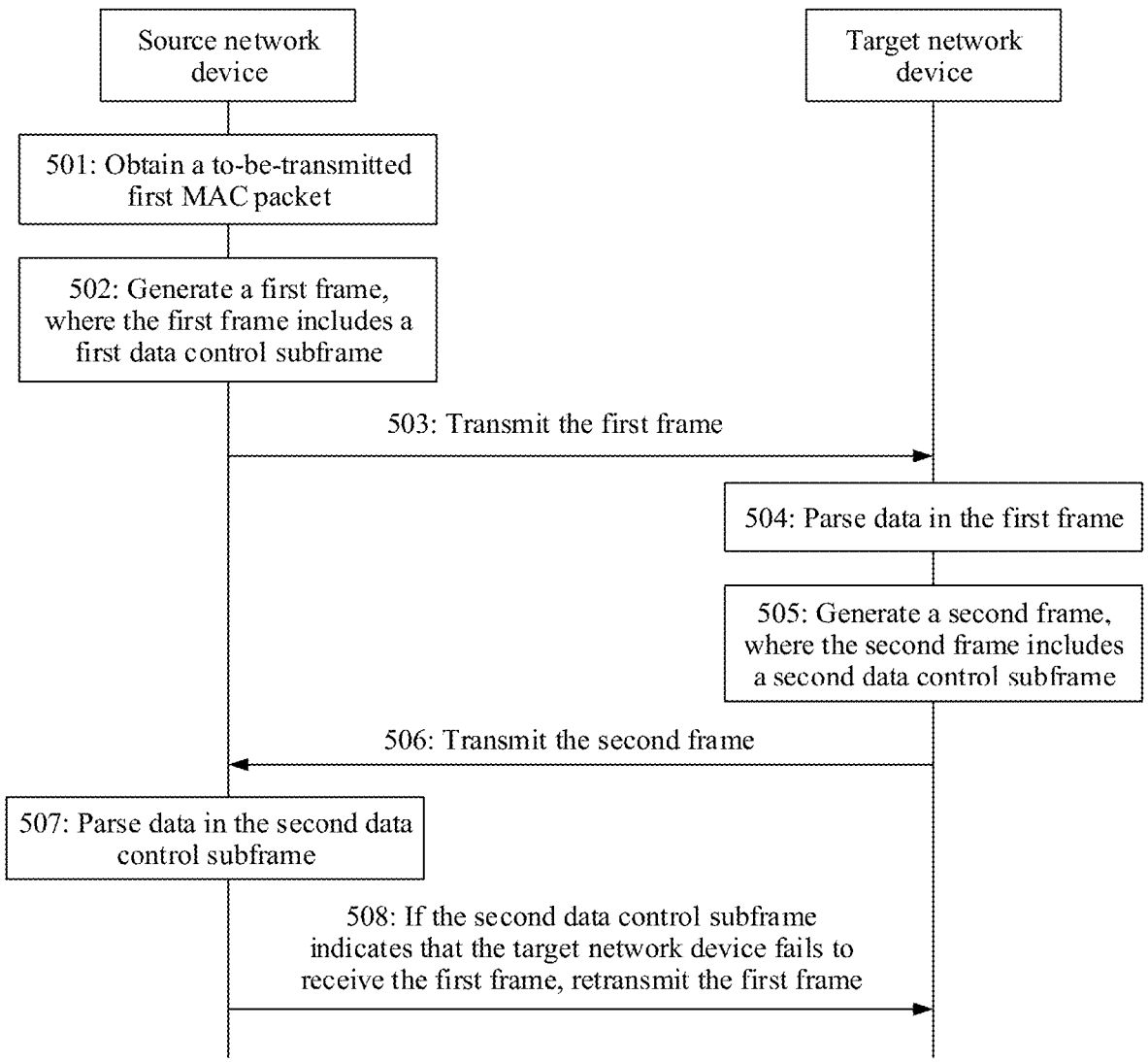
FIG. 5 is a schematic flowchart of operations of an embodiment of a data transmission method according to an embodiment of this application.
Figure 6A:
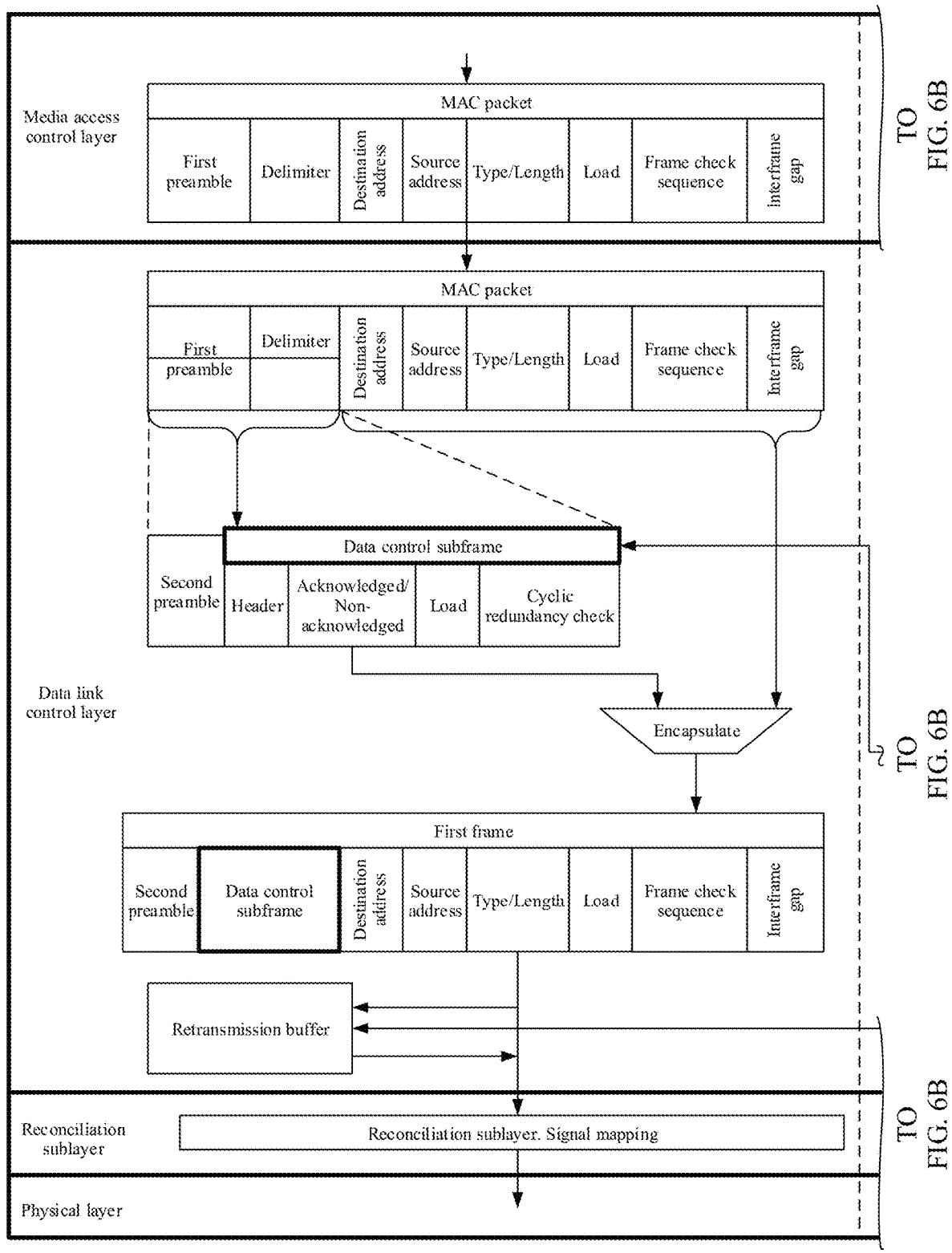
FIG. 6A and FIG. 6B are a schematic flowchart of an embodiment of retransmission processing according to an embodiment of this application.
Figure 6B:
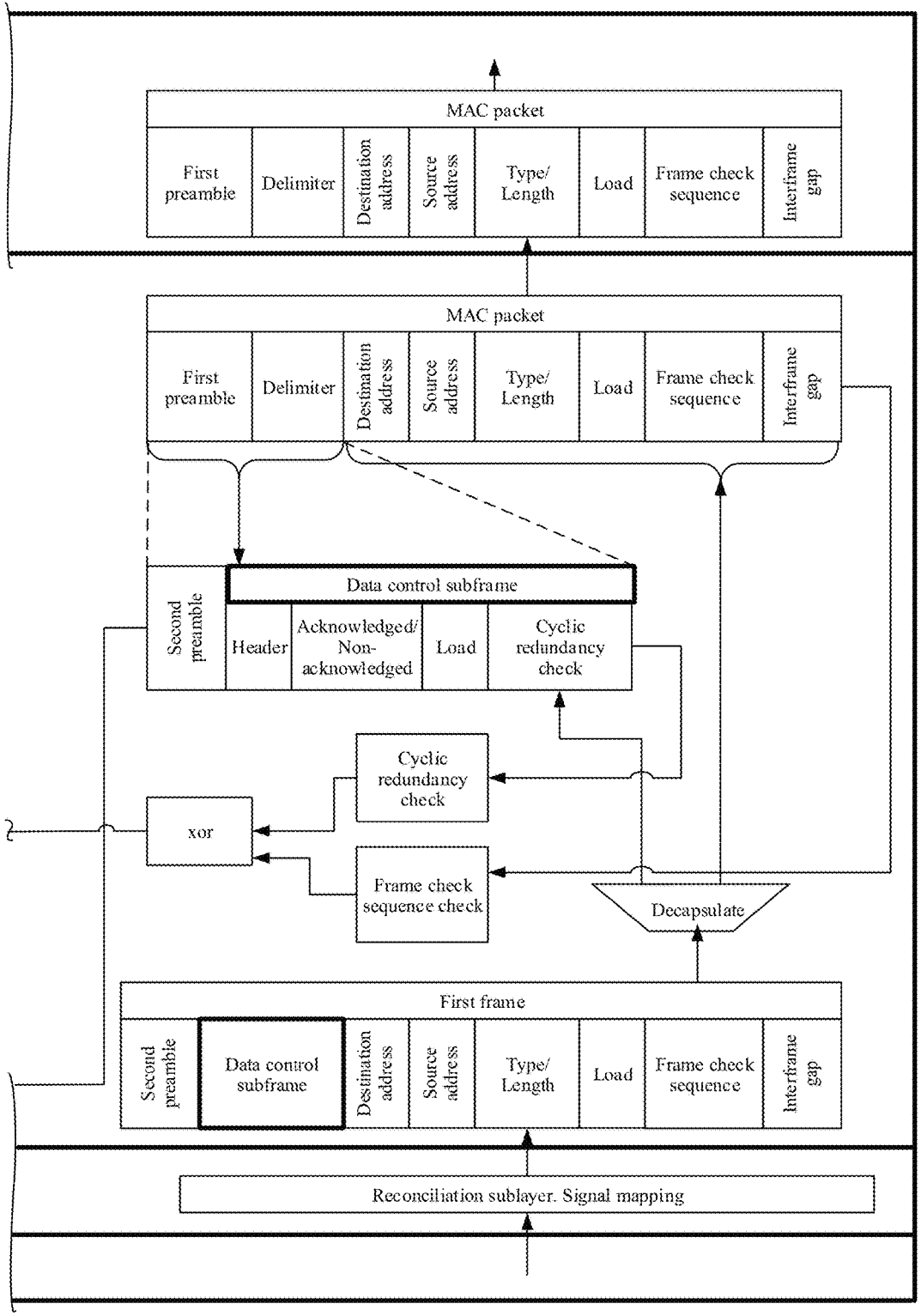

The following describes embodiments of this application in detail with reference to accompanying drawings. Refer to FIG. 5 and FIG. 6A and FIG. 6B.

Operation 501: A source network device obtains a to-be-transmitted first MAC packet, where the first MAC packet includes a first field and a second field.

The to-be-transmitted first MAC packet is received at a data link control layer from a MAC layer. The first field includes a preamble field and a SFD field, and the second field includes a destination address field, a source address field, a type or length field, a payload field, a frame check sequence field (also referred to as a first check field in this embodiment of this application), and an interframe gap field.

Operation 502: The source network device generates a first frame, where the first frame includes a first data control subframe.

Figure 7:
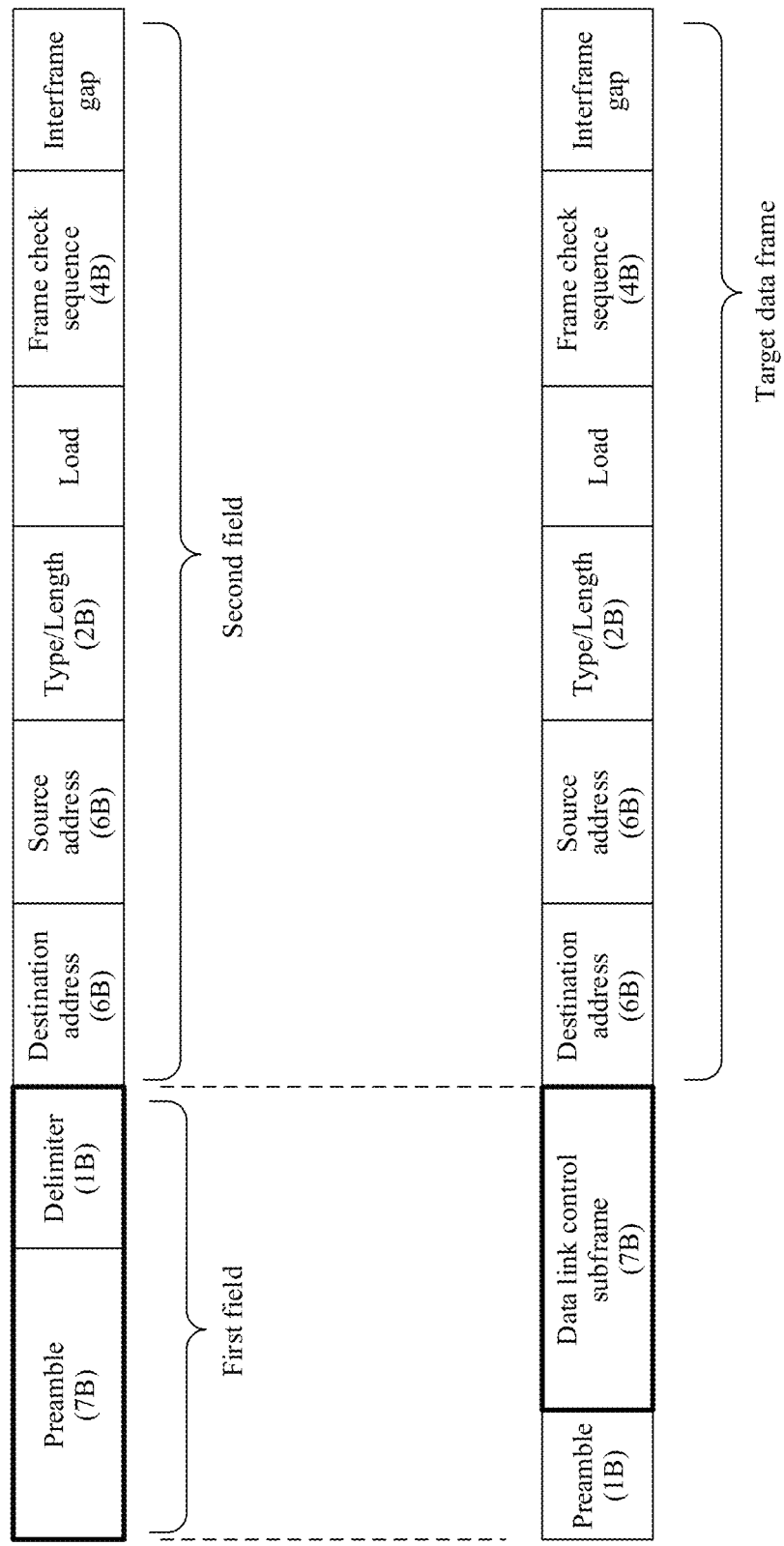
FIG. 7 is a schematic diagram of a data control subframe and a target data subframe that correspond to a MAC packet according to an embodiment of this application.

Refer to FIG. 7. The first MAC packet is modified, the first data control subframe is generated by using partial or entire space of the preamble field and the SFD field, and a first target data subframe is generated based on the second field; and the first data control subframe and the first target data subframe are encapsulated to obtain the first frame.

In this embodiment of this application, to distinguish between a preamble field in a MAC packet and a preamble field in a data frame (for example, the first frame) generated at the data link control layer, the preamble field in the MAC packet is also referred to as a first preamble field, and the preamble field in the data frame generated at the data link control layer is referred to as a second preamble field. A first byte to an $N^{th}$ byte of a first preamble field and the SFD field are used as a second preamble field, where N is an integer greater than or equal to 1 and less than 8. In one embodiment, the first data control subframe is generated by using field space other than the second preamble field in the first field. Then, the second preamble field, the first data control subframe, and the first target data subframe are encapsulated to obtain the first frame. For example, the first preamble field in the first MAC packet has seven bytes, the SFD field has one byte, the first field has eight bytes in total, and the second preamble field has one byte. That is, the first byte of the original first preamble field of the first MAC packet is reserved as the second preamble field of the first frame, and field space of a second byte to an eighth byte is used as space for generating the first data control subframe.

It should be noted that, in this embodiment of this application, N may be 2, 3, or the like. In this embodiment of this application, the first preamble field represents a preamble field of seven bytes in the MAC packet, the second preamble field represents a new preamble field generated at the data link control layer, and a quantity of bytes of the new preamble field is less than seven. For example, in this embodiment of this application, a quantity of bytes of the second preamble field is one. This is not limited.

The first data control subframe includes a check field, and a load field includes a sequence number of the first target data subframe. In one embodiment, the first data control subframe includes a second check field, where the second check field may be a cyclic redundancy check (CRC) field, and a value of the second check field is used by a target network device to verify whether the first data control subframe has a bit error. In one embodiment, the first data control subframe further includes a header field, where the header field of the first data control subframe is used to indicate whether the target network device needs to feed back a receiving status of the first target data subframe to the source network device.

A retransmission buffer (buffer) is disposed at the data link control layer, and a transmitted data frame (for example, the first frame) is buffered in the retransmission buffer.

Operation 503: The source network device transmits the first frame to the target network device.

The first frame is transmitted down to an RS layer. After being processed by the RS layer, the first frame is transmitted to a physical layer, and then is transmitted to the target network device by using a transmission medium (for example, a cable or an optical fiber).

Operation 504: The target network device receives the first frame, and parses data in the first frame.

The first frame is received at the data link control layer from the RS layer. The second preamble field is identified first, and then the data in the first frame is parsed after the second preamble field is identified, to obtain the first data control subframe and the first target data subframe.

In one embodiment, the target network device may determine, based on the second check field included in the first data control subframe and a first check field in the first target data subframe, whether the first frame is successfully received.

In one embodiment, the target network device verifies, based on a value of the CRC check field in the first data control subframe, whether the first data control subframe has a bit error; the target network device replaces locations of the first data control subframe and the second preamble field with the first preamble field of seven bytes and the SFD field of one byte, where a value of the first preamble field is recovered based on a value of the second preamble field; the target network device recovers the first target data subframe into the first MAC packet; and then the target network device verifies, based on the FCS field of the first target data subframe, whether the first MAC packet has a bit error. When the first data control subframe or the first MAC packet has a bit error, it is determined that the first frame is not successfully received. When neither the first data control subframe nor the first MAC packet has a bit error, it is determined that the first frame is successfully received. Further, the first MAC packet is transmitted to the MAC layer for processing.

Operation 505: The target network device generates a second frame, where the second frame includes a second data control subframe.

The second data control subframe includes a load field and a type field.

If the first frame is not successfully received, the type field of the second data control subframe carries a non-acknowledged identifier, and the load field carries the sequence number that is of the first target data subframe and that corresponds to the non-acknowledged identifier. If the first frame is successfully received, the type field carries an acknowledged identifier, and the load field carries the sequence number that is of the first target data subframe and that corresponds to the acknowledged identifier.

Operation 506: The target network device transmits the second frame.

The second data control subframe is transmitted down to the RS layer. After being processed by the RS layer, the second data control subframe is transmitted to the physical layer, and then is transmitted to the source network device by using a transmission medium (for example, a cable or an optical fiber).

Operation 507: The source network device receives the second data control subframe, and parses data in the second data control subframe.

The source network device identifies the load field and the type field in the second data control subframe.

If the type field carries the acknowledged identifier, it indicates that the target network device successfully receives the first frame, and the load field carries the sequence number that is of the first target data subframe and that corresponds to the acknowledged identifier. Then the source network device does not need to retransmit the first frame to the target network device.

If the type field carries the non-acknowledged identifier, and the load field carries the sequence number that is of the first target data subframe and that corresponds to the non-acknowledged identifier, it indicates that the target network device fails to receive the first frame, and the first frame in the retransmission buffer is fetched based on the sequence number that is of the first target data subframe and that corresponds to the non-acknowledged identifier; and operation 508 is performed.

Operation 508: The source network device retransmits the first frame to the target network device.

It should be noted that in this embodiment of this application, the source network device transmits the first frame to the target network device, where the first target data subframe includes a destination Internet protocol (IP) address of the target network device. Before the source network device transmits the first frame to a destination host for the first time, an address resolution protocol (ARP) should be transmitted first. The source network device determines a MAC address of the destination host based on the destination IP address, to facilitate subsequent data transmission and reception. The source network device sets a sequence number for a transmitted data frame based on the destination IP address of the destination host.

In this embodiment of this application, a data link control layer is introduced between a MAC layer and an RS layer in an existing Ethernet architecture, to complete a related operation on retransmission control at this layer, and generate, at the data link control layer, a data control subframe used for retransmission control, thereby reducing a bit error rate by using a retransmission mechanism. On a transmit end side, a transmit end modifies the first MAC packet at the MAC layer, generates the first data control subframe by using partial space of the first preamble field and the SFD field of the first MAC packet. It may also be understood that the generated first data control subframe is inserted into locations of the first preamble field and the SFD field in the first MAC packet, and the first preamble field and the SFD field are replaced with the first data control subframe and the second preamble field. Therefore, although a new data control subframe is generated at the data link control layer, there is no additional overhead, and a structure of each layer in the Ethernet architecture can be further considered. On a receive end side, the second data control subframe may also be generated. The second data control subframe may be used to feed back the receiving status of the first target data subframe. The second data control subframe carries the acknowledged or non-acknowledged identifier and the sequence number corresponding to the acknowledged or non-acknowledged identifier (that is, a sequence number indicating that a data frame is successfully received or a sequence number indicating that a data frame is not successfully received). Then the transmit end may retransmit a data frame that is not successfully received by the receive end, thereby reducing a link bit error rate.

Based on the foregoing embodiment, in an embodiment, in the operation 505, there are two cases for generating the second frame by the target network device.

In a first case, the target network device does not have data transmitted to the source network device, and the target network device generates the second data control subframe. In other words, the second frame includes only the second data control subframe.

In a second case, the target network device has data transmitted to the source network device. In other words, the second frame includes the second data control subframe and the second target data subframe. The generating a second frame may further include:

first, obtaining a second MAC packet from a MAC layer, where the second MAC packet includes a first field and a second field, the first field includes a preamble field and a SFD field, and the second field includes a destination address field, a source address field, a type or length field, a payload field, a frame check sequence field, and an interframe gap field;

then, generating the second data control subframe by using partial field space of the first field, reserving a first byte of an original first preamble field of the second MAC packet as a second preamble field of the second data control subframe, using field space of a second byte to an eighth byte as space for generating the second data control subframe, and generating the second target data subframe based on the second field, where the second target data subframe carries valid data that needs to be transmitted to the source network device; and finally, encapsulating the second preamble field, the second data control subframe, and the second target data subframe to obtain the second frame.

In one embodiment, in the second case, the load field of the second data control subframe further carries a sequence number of the second target data subframe.

Figure 8:
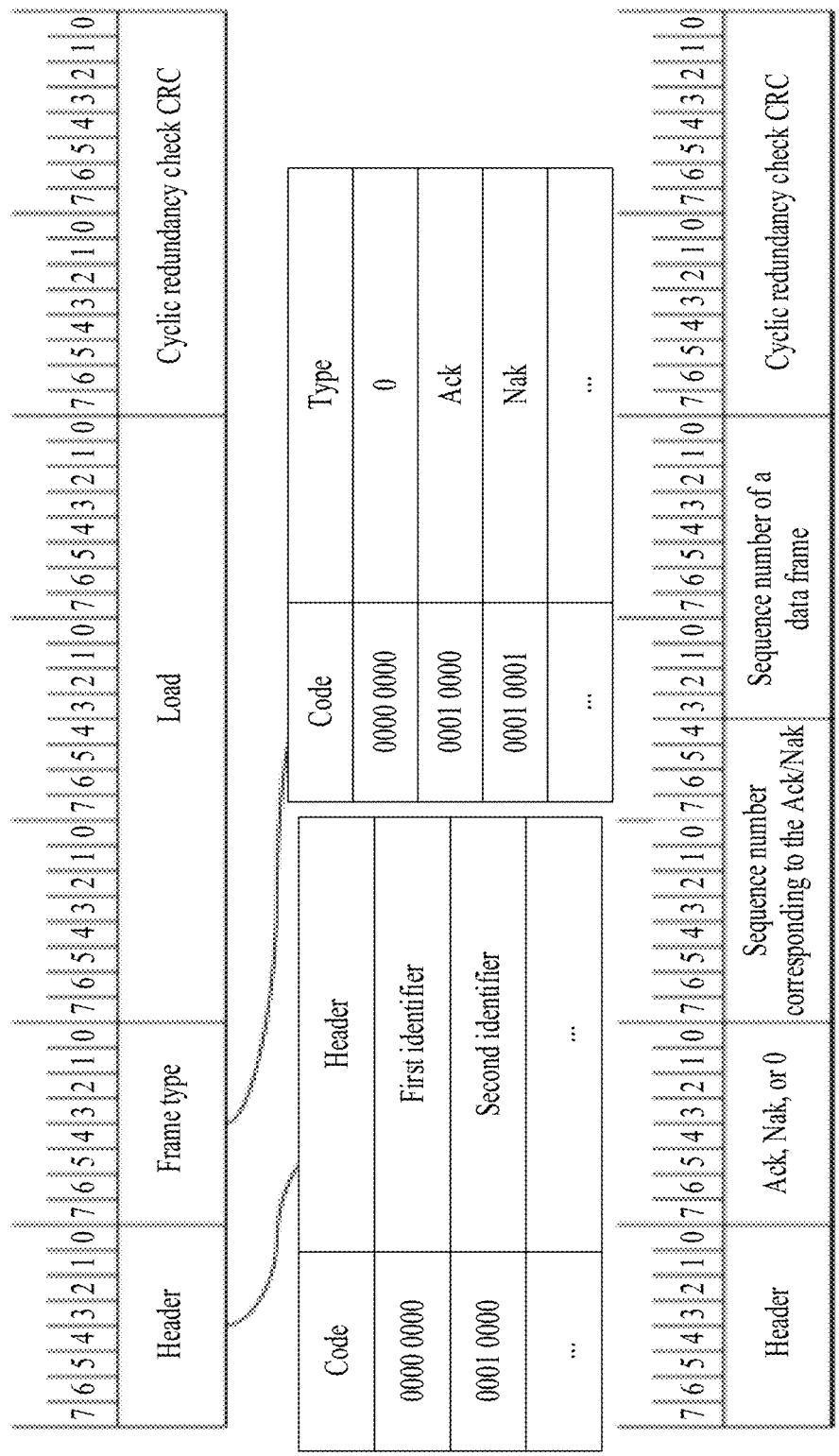
FIG. 8 is a schematic diagram of a structure of another example of a data control subframe according to an embodiment of this application.

Based on the foregoing embodiment, in an embodiment, in the operation 502, the first data control subframe generated by the source network device may further include a header field, where the header field is used to indicate whether the target network device needs to feed back the receiving status of the first target data subframe. Refer to FIG. 8. If the header field carries a first identifier (for example, 00000000), the first identifier is used to indicate that the target network device does not need to feed back the receiving status of the first target data subframe to the source network device. If the header field carries a second identifier (for example, 00010000), the second identifier is used to indicate that the target network device needs to feed back the receiving status of the first target data subframe to the source network device.

In the operation 504, the target network device receives the first frame, parses the first data control subframe, and identifies the header field in the first data control subframe.

When the target network device identifies that the header field is the first identifier, there are the following two cases:

In a first case, the target network device needs to transmit data to the source network device. In the operation 505, the second frame generated by the target network device includes the second data control subframe and the second target data subframe; the second data control subframe includes the type field and the load field; the type field does not carry the acknowledged identifier or the non-acknowledged identifier, that is, a value of the type field is a preset value, and the preset value may be all "0" or another value (for example, all "1"); and the load field carries only the sequence number of the second target data subframe.

In a second case, if the target network device does not need to transmit data to the source network device, the operation 505 to the operation 508 are all possible operations, and may be not performed.

When the target network device identifies that the header field is the second identifier, there are the following two cases:

In a first case, the target network device needs to transmit a data frame to the source network device. In the operation 505, the second frame generated by the target network device includes the second data control subframe and the second target data subframe, the second data control subframe includes the type field and the load field, the type field carries the acknowledged identifier or the non-acknowledged identifier, and the load field carries the sequence number of the first target data subframe and the sequence number of the second target data subframe that correspond to the acknowledged identifier or the non-acknowledged identifier.

In a second case, the target network device does not need to transmit a data frame to the source network device. In the operation 505, the second frame generated by the target network device includes only the second data control subframe, the type field carries the acknowledged identifier or the non-acknowledged identifier, and the load field carries the sequence number that is of the first target data subframe and that corresponds to the acknowledged identifier or the non-acknowledged identifier. Because there is no data frame that needs to be transmitted, the load field does not need to carry a sequence number of a target data subframe.

In one embodiment, the second identifier may further include a first sub-identifier (for example, 00010001) and a second sub-identifier (for example, 00010010). Whether the first frame includes the first target data subframe may be identified by using the first sub-identifier and the second sub-identifier. If the header field carries the first sub-identifier, the first sub-identifier indicates that the first frame includes the first data control subframe and the first target data subframe, that is, the first data control subframe is connected to the first target data subframe. At the receive end, the first target data subframe needs to be recovered into the first MAC packet based on a frame format of the MAC layer, and the first MAC packet is transmitted to the MAC layer for processing. If the header field carries the second sub-identifier, the second sub-identifier indicates that the first frame includes only the first data control subframe, that is, there is no target data subframe connected to the first data control subframe, and the receive end does not need to transmit a corresponding data frame to the MAC layer.

It should be noted that in this embodiment, a value of the header field of the first data control subframe is described. For a value of a header field of the second data control subframe in this embodiment of this application, refer to the value of the header field of the first data control subframe in this embodiment. Details are not described below again.

Figure 9:
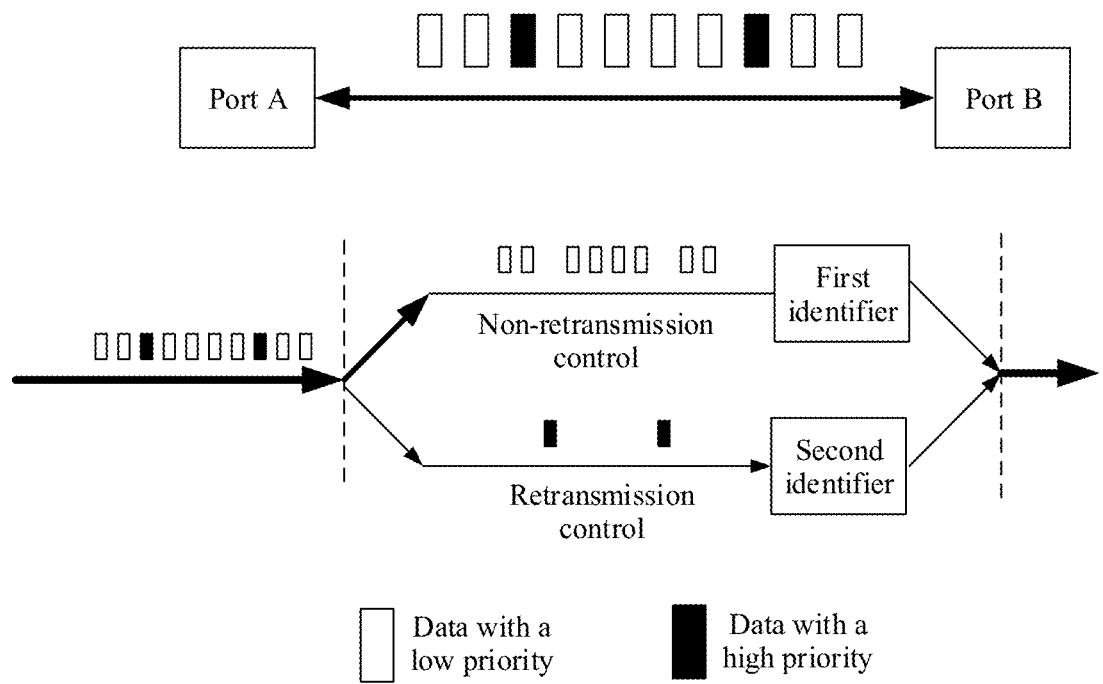
FIG. 9 is a schematic diagram of a per queue automatic repeat-request control scenario according to an embodiment of this application.

Based on the foregoing embodiment, in an embodiment, retransmission control may be performed based on a transmission level of data in this embodiment. Data with a high priority has a high QoS requirement and data with a low priority has a low QoS requirement. Whether transmitted data is retransmitted is distinguished based on a QoS requirement, namely, per queue automatic repeat-request (PQ-ARQ). In this embodiment, there are two types of data frames. A first type of data frame is data that does not need to be retransmitted and that has a low priority, and this part of data occupies a large part of a link bandwidth. A second type of data frame is data that requires lossless transmission and that has a high priority, this part of data requires retransmission control to ensure lossless transmission of this part of data, and this part of data occupies a small part of a link bandwidth. As shown in FIG. 9, data is transmitted from a port A to a port B, and an interface rate is R (for example, R is 100 Gbps). In transmitted bandwidth data of 100 Gbps, only (R×a) data (for example, a is 0.001) is data with a high priority and requires lossless transmission. In this scenario, retransmission control needs to be performed on only data of 100 Mbps, and remaining [R×(1−a)] (for example, 99.9 Gbps) data does not require retransmission control, where R is greater than or equal to 0, and a is greater than or equal to 0 and is less than or equal to 1.

In one embodiment, the transmit end may determine, based on a transmission level of the first target data subframe, an identifier carried in the header field.

If the transmission level of the first target data subframe is a low priority, it is determined that the header field of the first data control subframe carries a first identifier, where the first identifier is used to indicate that the target network device does not need to feed back the receiving status of the first target data subframe to the source network device. If the transmission level of the first target data subframe is a high priority, it is determined that the header field of the first data control subframe carries a second identifier, where the second identifier is used to indicate that the target network device needs to feed back the receiving status of the first target data subframe to the source network device.

In this embodiment, for Ethernet data, not all data requires lossless transmission. Therefore, ARQ retransmission control may not be performed on all data, and retransmission control may be performed on only data with a high priority. In this way, a retransmission probability can be effectively reduced, there is no need to buffer all packets, and only the data with a high priority needs to be buffered. In this way, a storage capacity for data buffering can be greatly reduced, to reduce a pressure on a chip area.

Figure 10:
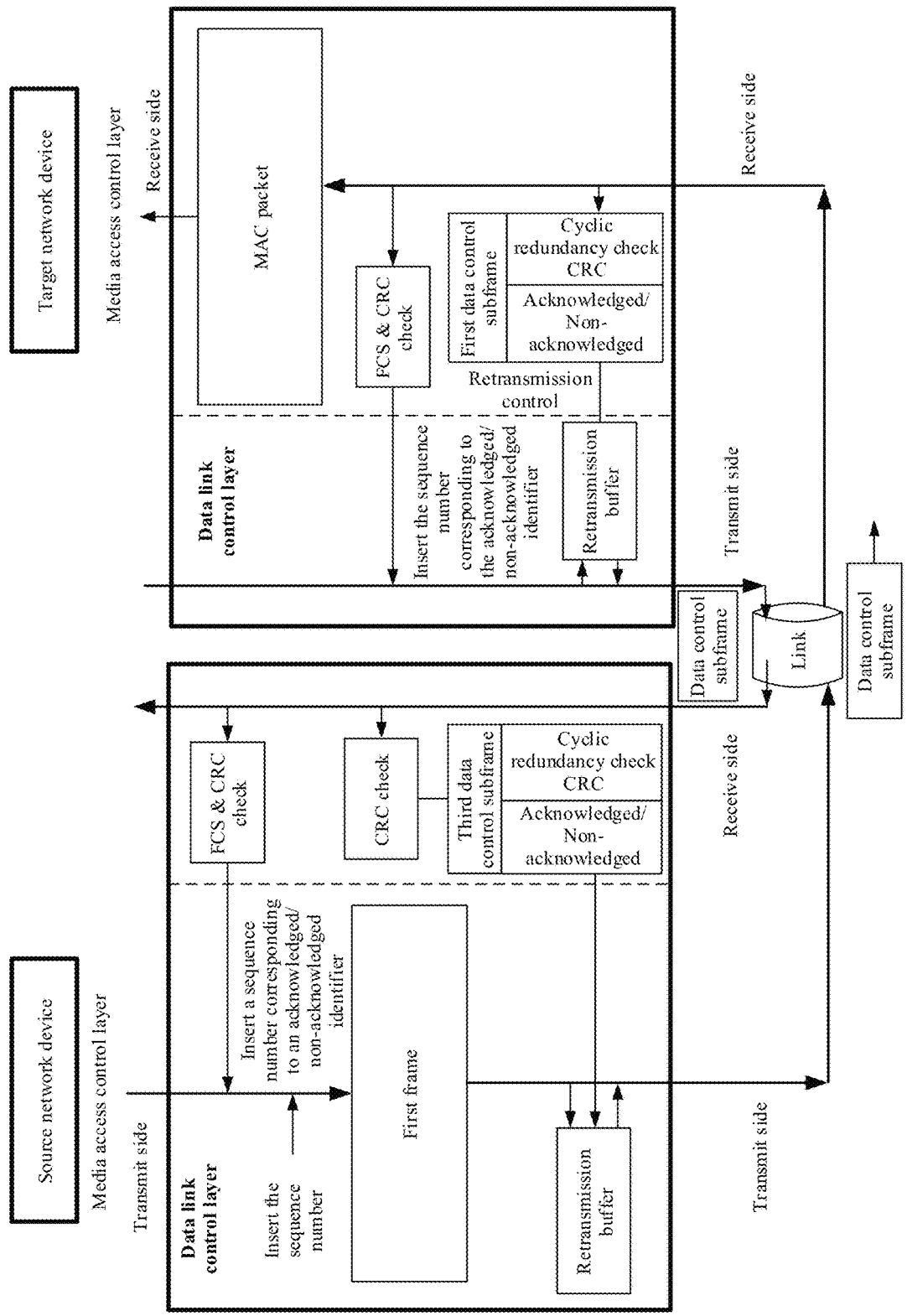
FIG. 10 is a schematic flowchart of another embodiment of retransmission processing according to an embodiment of this application.

Based on the foregoing embodiment, in an embodiment, refer to FIG. 10. An Ethernet interface is in a full-duplex mode, and data receiving and data transmission coexist, that is, the source network device is a transmit end device and is also a receive end device, and the target network device is a receive end device and is also a transmit end device. The receive end and the transmit end are relative concepts. Therefore, a format of the first data control subframe generated by the source network device and a format of the second data control subframe generated by the target network device are the same, and the first data control subframe and the second data control subframe each include a header field, a type field, a load field, and a CRC check field.

When the first data control subframe is connected (or connected in series, or spliced) to the first target data subframe, and the second data control subframe is connected to the second target data subframe, based on the full-duplex mode of the Ethernet interface, before the operation 502, the method further includes:

The source network device receives a third frame transmitted by the target network device. The third frame includes a third data control subframe and a third target data subframe. The third data control subframe and the second data control subframe (or the first data control subframe) have a same format. The third target data subframe and the first target data subframe have a same format. For a generation method of the third data control subframe and the third target data subframe in the third frame, refer to the method operations of generating the first frame by the source network device in operation 502 in the foregoing embodiment. Details are not described herein again.

In the operation 502, the source network device generates the first frame.

The first data control subframe includes a header field, a type field, a load field, and a CRC check field.

The header field indicates whether the target network device feeds back the receiving status of the first target data subframe to the source network device.

The source network device determines whether the third data control subframe has a bit error by using a CRC check field in the third data control subframe. The source network device replaces the third data control subframe and a second preamble field with a first preamble field and a SFD field based on a frame format of a MAC layer, to obtain a MAC packet, and then determines whether the MAC packet has a bit error by using an FCS field in the MAC packet. If the third data control subframe or the MAC packet has a bit error, it is determined that the third frame is not successfully received. If neither the third data control subframe nor the MAC packet has a bit error, it is determined that the third frame is successfully received. If the third frame is successfully received, further, the MAC packet is transmitted to the MAC layer for processing.

If the first frame is transmitted to the target network device at a first moment, the value of the type field indicates whether the third frame transmitted by the target network device is successfully received before the first moment.

If the source network device successfully receives the third frame, the type field carries an acknowledged identifier. If the source network device fails to receive the third frame, the type field carries a non-acknowledged identifier. The load field of the first data control subframe includes a sequence number of the third target data subframe and the sequence number of the first target data subframe that correspond to the acknowledged or non-acknowledged identifier.

If the source network device fails to receive the third frame, after the operation 504 and before the operation 505, the following operations are further included: The target network device fetches the third frame in the retransmission buffer based on the sequence number that is of the third target data subframe and that corresponds to the non-acknowledged identifier; and the target network device retransmits the third frame to the source network device.

If the source network device successfully receives the third frame, the source network device replaces the second data control subframe and a second preamble field with a first preamble field and a SFD field based on a frame format of a MAC layer to obtain a MAC packet; and then the source network device transmits the MAC packet to the MAC layer for processing.

It may be understood that the source network device (the transmit end) transmits the first frame to the target network device (the receive end) based on the full-duplex mode of the Ethernet interface, where the first frame carries the first target data subframe transmitted to the target network device at the first moment; and then the source network device feeds back, by using the first data control subframe, a receiving status of the third frame received before the first moment.

Similarly, in the operation 505, in the operation in which the target network device generates the second frame, the second data control subframe includes a header field, a type field, a load field, and a CRC check field.

The header field indicates whether the source network device feeds back the receiving status of the second target data subframe.

The target network device determines whether the first data control subframe has a bit error by using the CRC check field in the first data control subframe; and the target network device replaces the first data control subframe and the second preamble field with the first preamble field and the SFD field based on the frame format of the MAC layer, to obtain the first MAC packet, and determines whether the first MAC packet has a bit error by using the FCS field in the first MAC packet. If the first data control subframe or the first MAC packet has a bit error, it is determined that the first frame is not successfully received. If neither the first data control subframe nor the first MAC packet has a bit error, it is determined that the first frame is successfully received. If the first frame is successfully received, further, the first MAC packet is transmitted to the MAC layer for processing.

The type field indicates the receiving status of the first target data subframe. If the first frame is not successfully received, the type field of the second data control subframe carries a non-acknowledged identifier, and the load field carries the sequence number that is of the first target data subframe and that corresponds to the non-acknowledged identifier. If the first frame is successfully received, the type field carries an acknowledged identifier, and the load field carries the sequence number that is of the first target data subframe and that corresponds to the acknowledged identifier.

It may be understood that the target network device (the transmit end) transmits the second frame to the source network device (the receive end) based on the full-duplex mode of the Ethernet interface, where the second frame carries the second target data subframe transmitted to the source network device at a second moment; and then the target network device feeds back, by using the second data control subframe, a receiving status of the first frame received before the second moment, to reduce a bit error rate by using a retransmission mechanism, where the second moment is later than the first moment.

Figure 11:
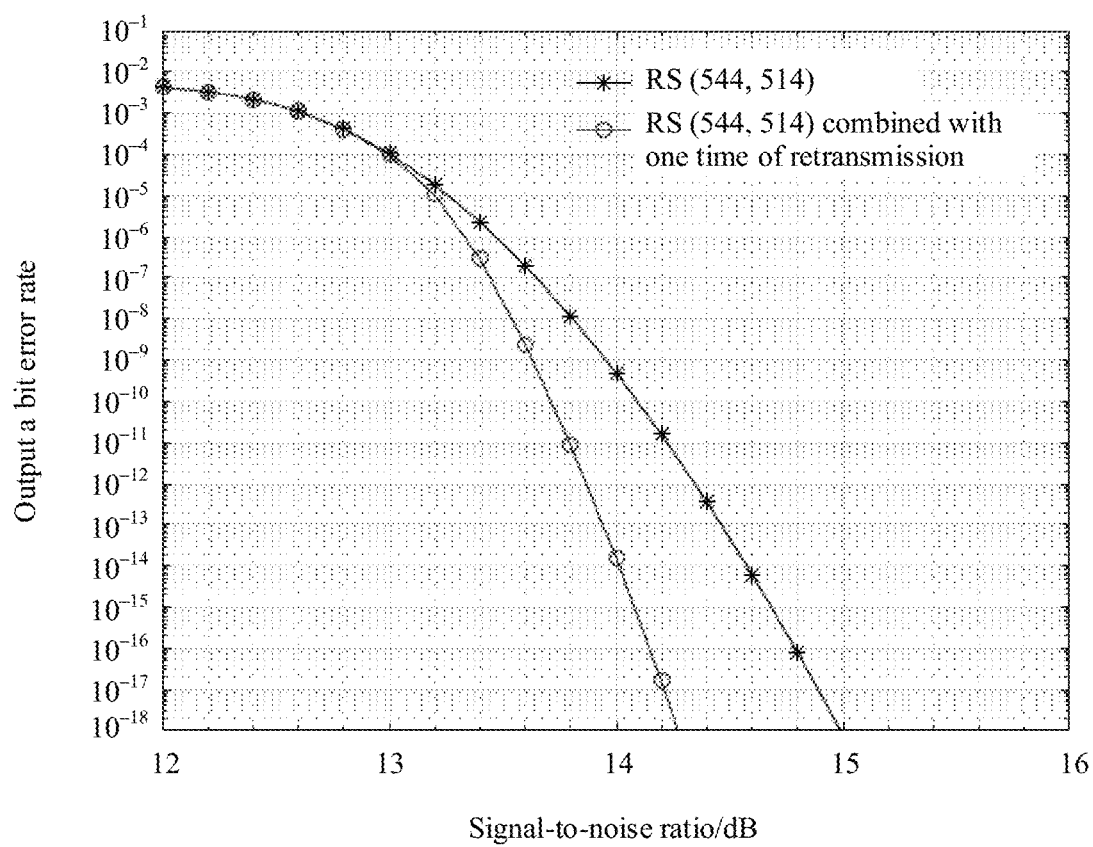
FIG. 11 is a schematic diagram of performance simulation based on a combination of forward error correction and a retransmission mechanism according to an embodiment of this application.

Based on the foregoing embodiment, in an embodiment, the retransmission mechanism may be combined with another error correction method. For example, in this embodiment, the retransmission mechanism may be combined with FEC, and retransmission control is performed in a low bit error rate condition after FEC error correction. 400 GE Ethernet is used as an example. In a 400 GE architecture, Reed Solomon (RS) (544, 514) error correction code FEC is used to perform gain compensation on a link loss. However, RS (544, 514) FEC has a risk when a single-link loss rate is equal to or greater than 100 Gbps. The RS (544, 514) FEC is combined with ARQ, and ARQ retransmission control is performed after FEC error correction is performed on data, so that an equivalent output bit error rate of FEC can be reduced by several orders of magnitude, thereby effectively ensuring a link output bit error rate and improving reliability of the Ethernet interface. FIG. 11 shows performance simulation of a combination of FEC and ARQ (one time of retransmission). For example, RS (544, 514) is combined with one time of ARQ, so that an output bit error rate can be reduced by four to five orders of magnitude. If RS (544, 514) is combined with a plurality of times of ARQ retransmission, lossless transmission of the Ethernet interface can be implemented.

In one embodiment, before the operation 502, the method further includes:
  performing error correction processing on the first frame through forward error correction FEC; and
  if a bit error rate of the first frame is higher than a threshold, performing the operation 502.

The combination of ARQ and FEC can effectively reduce the equivalent output bit error rate of FEC. A principle of FEC is mainly that particular check bits are added at a coding phase of the physical layer to implement online real-time error correction at an algorithm level, so that a link bit error rate is reduced to implement reliable link transmission. In this embodiment of this application, retransmission control is completed at the data link control layer, FEC does not affect the method operations from the operation 501 to the operation 508 in the method embodiment of this application, and ARQ retransmission control is performed after FEC. In this way, it is ensured that an input bit error rate of ARQ control logic is maintained at a low level, the retransmission probability can be effectively reduced, effective link utilization is ensured, and a delay introduced by retransmission can be further reduced to an extremely low level.

Figure 12:
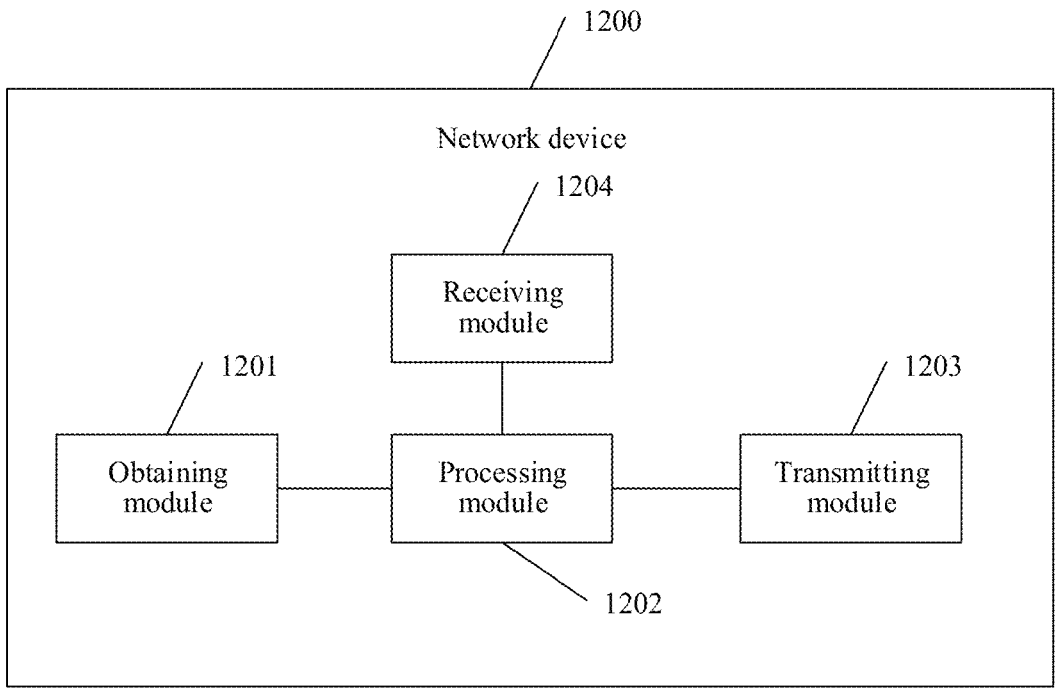
FIG. 12 is a schematic diagram of a structure of an embodiment of a network device according to an embodiment of this application.

The foregoing describes the method embodiments in embodiments of this application. The following describes an apparatus in embodiments of this application. FIG. 12 is a schematic diagram of a structure of an embodiment of a network device 1200. The network device is configured to perform the method operations performed by the source network device in the foregoing method embodiments. The network device includes an obtaining module 1201, a processing module 1202, a transmitting module 1203, and a receiving module 1204.

The obtaining module 1201 is configured to perform the operation 501 in the method embodiment corresponding to FIG. 5. The processing module 1202 is configured to perform the operation of parsing the data in the second data control subframe in the operation 502 and the operation 507. The transmitting module 1203 is configured to perform the operations 503 and 508. The receiving module 1204 is configured to perform the operation of receiving the second data control subframe in the operation 507.

In one embodiment, the obtaining module 1201 obtains a to-be-transmitted first MAC packet, where the first MAC packet includes a first field and a second field.

The processing module 1202 generates a first frame, where the first frame includes a first data control subframe obtained by using field space of the first field and a first target data subframe obtained based on the second field, the first data control subframe and the first target data subframe are obtained by the obtaining module 1201, and the first data control subframe includes a sequence number of the first target data subframe.

The transmitting module 1203 transmits the first frame generated by the processing module 1202 to a target network device.

In one embodiment, the first field includes a preamble field and a SFD field, and the processing module 1202 is further configured to: generate the first data control subframe by using partial or entire space of the preamble field and the SFD field, and generate the first target data subframe based on the second field; and encapsulate the first data control subframe and the first target data subframe to obtain the first frame.

In one embodiment, the second field includes a destination address field, a source address field, a type or length field, a payload field, and a frame check sequence field.

In one embodiment, the first target data subframe further includes a first check field, and the first data control subframe includes a second check field; and a value of the first check field is used by the target network device to verify whether the first MAC packet has a bit error, and a value of the second check field is used by the target network device to verify whether the first data control subframe has a bit error.

In one embodiment, the receiving module 1204 is configured to receive a second frame transmitted by the target network device, where the second frame includes a second data control subframe, and the second data control subframe includes a type field and a load field.

The processing module 1202 is further configured to: parse the second data control subframe received by the receiving module 1204, and identify a value of the type field and a value of the load field; and if the value of the type field of the second data control subframe is a non-acknowledged identifier, and the load field of the second data control subframe carries the sequence number that is of the first target data subframe and that corresponds to the non-acknowledged identifier, fetch the first frame in a retransmission buffer based on the sequence number that is of the first target data subframe and that corresponds to the non-acknowledged identifier.

The transmitting module 1203 is further configured to: retransmit the first frame to the target network device; or if the value of the type field of the second data control subframe is an acknowledged identifier, and the load field of the second data control subframe carries the sequence number that is of the first target data subframe and that corresponds to the acknowledged identifier, indicate, by using the acknowledged identifier, that the target network device successfully receives the first frame.

In one embodiment, the second frame further includes a second target data subframe, and a format of the second target data subframe is the same as a format of the first target data subframe.

The processing module 1202 is further configured to replace the second data control subframe in the second frame with a preamble field and a SFD field based on a frame format of a MAC layer, to obtain a MAC packet.

The obtaining module 1201 is configured to transmit the MAC packet obtained by the processing module 1202 to the MAC layer for processing.

In one embodiment, the second frame includes a second target data subframe, and the second data control subframe carries, by using the load field, a sequence number corresponding to the second target data subframe.

In one embodiment, the second data control subframe further includes a header field, where the header field of the second data control subframe is used to indicate whether the source network device needs to feed back a receiving status of the second target data subframe to the target network device.

In one embodiment, the first data control subframe further includes a header field, where the header field of the first data control subframe is used to indicate whether the target network device needs to feed back a receiving status of the first target data subframe to the source network device.

In one embodiment, the processing module 1202 is further configured to: when a transmission level of the first target data subframe is a low priority, determine that the header field of the first data control subframe carries a first identifier, where the first identifier is used to indicate that the target network device does not need to feed back the receiving status of the first target data subframe to the source network device; and when the transmission level of the first target data subframe is a high priority, determine that the header field of the first data control subframe carries a second identifier, where the second identifier is used to indicate that the target network device needs to feed back the receiving status of the first target data subframe to the source network device.

Refer to FIG. 12. The network device may be further configured to perform the method operations performed by the target network device in the foregoing method embodiments. The receiving module 1204 is further configured to perform the operation 504 in the embodiment corresponding to FIG. 5, the processing module 1202 is further configured to perform the operation 505, and the transmitting module 1203 is further configured to perform the operation 506.

In one embodiment, the receiving module 1204 is configured to receive a first frame transmitted by a source network device, where the first frame includes a first data control subframe and a first target data subframe, the first data control subframe is generated by using field space of a first field of a first MAC packet obtained from an upper layer, the first target data subframe is generated based on a second field of the first MAC packet, and the first data control subframe carries a sequence number corresponding to the first target data subframe.

The processing module 1202 is configured to generate a second frame, where the second frame includes a second data control subframe, and if the first frame is not successfully received, the second data control subframe carries a non-acknowledged identifier by using a type field and carries, by using a load field, the sequence number that is of the first target data subframe and that corresponds to the non-acknowledged identifier, or if the first frame is successfully received, the second data control subframe carries an acknowledged identifier by using the type field and carries, by using the load field, the sequence number that is of the first target data subframe and that corresponds to the acknowledged identifier.

The transmitting module 1203 is configured to transmit the second frame generated by the processing module 1202 to the source network device.

In one embodiment, the second frame further includes a second target data subframe, and the second data control subframe carries a sequence number of the second target data subframe by using the load field.

In one embodiment, the obtaining module 1201 is configured to obtain a second MAC packet from a MAC layer, where the second MAC packet includes a first field and a second field.

The processing module 1202 is configured to: generate the second data control subframe by using partial field space of the first field received by the obtaining module 1201, and generate the second target data subframe based on the second field; and encapsulate the second data control subframe and the second target data subframe to obtain the second frame.

In one embodiment, the first field includes a preamble field and a SFD field.

In one embodiment, the second field includes a destination MAC address field, a source MAC address field, a type or length field, a payload field, and a frame check sequence field.

In one embodiment, the first target data subframe includes a first check field; and the first data control subframe includes a second check field.

The processing module 1202 is configured to:
verify, by using the first check field, whether the first MAC packet has a bit error;
verify, by using the second check field, whether the first data control subframe has a bit error; and if it is determined that the first MAC packet has a bit error or the first data control subframe has a bit error, determine that the first frame is not successfully received.

In one embodiment, the second frame includes a second target data subframe, the second target data subframe includes a first check field, and the second data control subframe includes a second check field; and a value of the first check field is used by the source network device to verify whether the second MAC packet has a bit error, and a value of the second check field is used by the source network device to verify whether the second data control subframe has a bit error.

In one embodiment, the first data control subframe further includes a header field, where a value of the header field of the first data control subframe is used to indicate whether the target network device needs to feed back a receiving status of the first target data subframe to the source network device.

The processing module 1202 is configured to:
parse the first data control subframe to obtain the value of the header field; and
if the value of the header field of the first data control subframe is a first identifier, set the type field of the second data control subframe to a preset value; or
if the value of the header field of the first data control subframe is a second identifier, determine whether the first frame is successfully received.

In one embodiment, the second data control subframe further includes a header field, where a value of the header field of the second data control subframe is used to indicate whether the source network device needs to feed back a receiving status of the second target data subframe to the target network device.

In one embodiment, the processing module 1202 is further configured to: perform error correction processing on the first frame through forward error correction FEC; and if a bit error rate of the first frame is higher than a threshold, perform the operation of generating the second frame.

Figure 13:
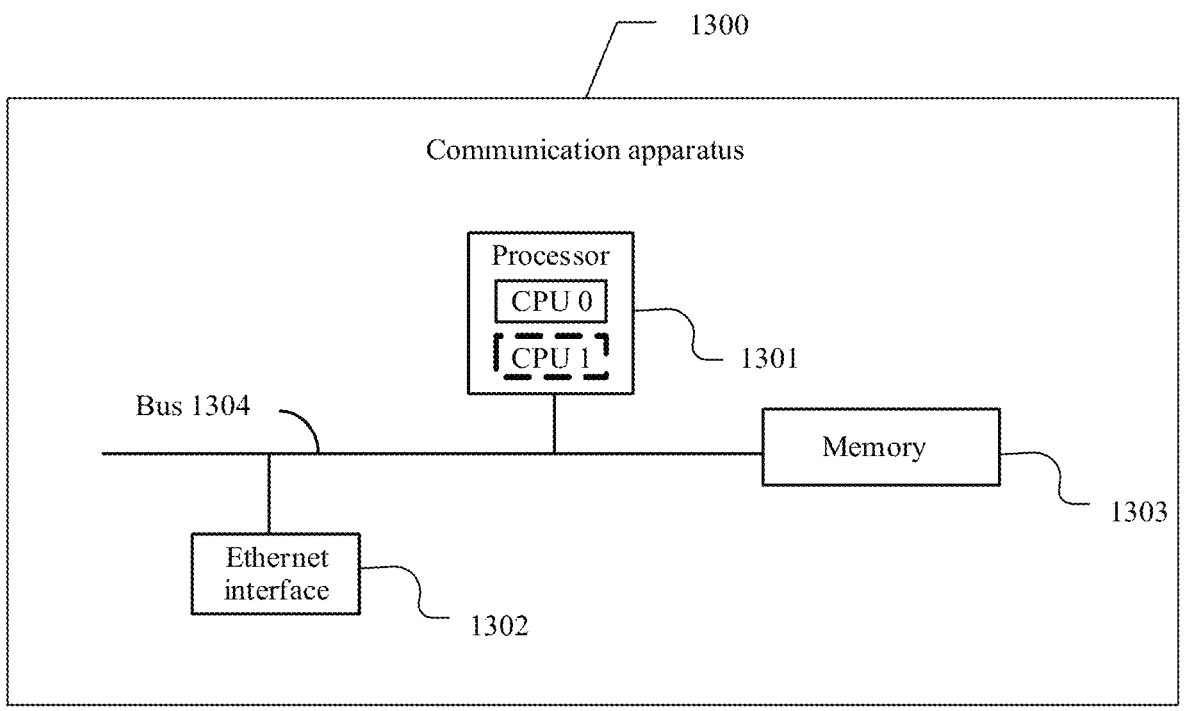
FIG. 13 is a schematic diagram of a structure of another embodiment of a network device according to an embodiment of this application.

Further, the network device in FIG. 12 is presented in a form of a functional module. The "module" herein may refer to an application-specific integrated circuit (ASIC), a circuit, a processor and a memory that execute one or more software or firmware programs, an integrated logic circuit, and/or another device that can provide the foregoing functions. In a simple embodiment, the network device in FIG. 12 may use a form shown in FIG. 13. The modules may be implemented by using a processor 1301, an Ethernet interface 1302, and a memory 1303 in FIG. 13.

The memory 1303, the processor 1301, and the Ethernet interface 1302 are connected by using a bus 1304. The processor 1301 may be a central processing unit (CPU), a microprocessor, or an integrated circuit that has a function. The Ethernet interface 1302 is configured to receive and transmit Ethernet data. The memory 1303 may be a read-only memory (ROM) or another type of static storage device that can store static information and instructions, or a random access memory (RAM) or another type of dynamic storage device that can store information and instructions. The processor 1301 is configured to execute the instructions in the memory 1303, to enable the network device to perform the method operations performed by the source network device in the foregoing method embodiments, or to enable the network device to perform the method operations performed by the target network device in the foregoing method embodiments.

In one embodiment, when the apparatus is a chip in a terminal, the chip includes a processing unit and a communication unit, where the processing unit may be, for example, a processor, and the communication unit may be, for example, an input/output interface, a pin, or a circuit. The processing unit may execute computer executable instructions stored in a storage unit, to enable the chip in the terminal to perform the data transmission method according to any item of the first aspect. In one embodiment, the storage unit is a storage unit in the chip, for example, a register or a cache. The storage unit may alternatively be a storage unit outside the chip in the terminal, for example, a read-only memory (ROM) or another type of static storage device that can store static information and instructions, or a random access memory (RAM).

Any processor described above may be a general-purpose central processing unit (CPU), a microprocessor, an application-specific integrated circuit (ASIC), or one or more integrated circuits configured to control program execution of the data transmission method according to the first aspect.

It may be clearly understood by persons skilled in the art that, for the purpose of convenient and brief description, for a detailed working process of the foregoing system, apparatus, and unit, refer to a corresponding process in the foregoing method embodiment. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software function unit.

When the integrated unit is implemented in the form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) to perform all or some of the operations of the methods described in embodiments of this application. The storage medium includes any medium that can store program code, such as a USB flash drive, a removable hard disk, a Read-Only Memory (ROM), a Random Access Memory (RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A data transmission method applied to a source network device, the data transmission method comprising:
    obtaining a to-be-transmitted first media access control (MAC) packet comprising a first field and a second field;
    generating a first frame comprising a first data control subframe obtained by using field space of the first field and a first target data subframe obtained based on the second field, and the first data control subframe comprises a sequence number of the first target data subframe and a header field used to indicate whether a target network device needs to feed back a receiving status of the first target data subframe to the source network device;
    transmitting the first frame to the target network device; and
    when a transmission level of the first target data subframe is a low priority, determining that the header field of the first data control subframe carries a first identifier used to indicate that the target network device does not need to feed back the receiving status of the first target data subframe to the source network device; or
    when the transmission level of the first target data subframe is a high priority, determining that the header field of the first data control subframe carries a second identifier used to indicate that the target network device needs to feed back the receiving status of the first target data subframe to the source network device.

2. The data transmission method according to claim 1, wherein the first field comprises a preamble field and a start frame delimiter (SFD) field, and generating the first frame comprises:
    generating the first data control subframe by using a partial or an entire space of the preamble field and the SFD field, and generating the first target data subframe based on the second field; and
    encapsulating the first data control subframe and the first target data subframe to obtain the first frame.

3. The data transmission method according to claim 1, wherein the second field comprises a destination MAC address field, a source MAC address field, a type or length field, a payload field, and a frame check sequence field, wherein, the first target data subframe further comprises a first check field, and the first data control subframe further comprises a second check field, wherein a value of the first check field is used by the target network device to verify whether the first MAC packet has a bit error, and a value of the second check field is used by the target network device to verify whether the first data control subframe has a bit error.

4. The data transmission method according to claim 1, wherein after transmitting the first frame to the target network device, the method further comprises:

receiving a second frame transmitted by the target network device, wherein the second frame comprises a second data control subframe, and the second data control subframe comprises a type field and a load field;

parsing the second data control subframe, and identifying a value of the type field and a value of the load field;

when the value of the type field of the second data control subframe is a non-acknowledgement identifier, and the load field of the second data control subframe carries the sequence number that is of the first target data subframe and that corresponds to the non-acknowledgement identifier, fetching the first frame in a retransmission buffer based on the sequence number that is of the first target data subframe and that corresponds to the non-acknowledgement identifier; and retransmitting the first frame to the target network device; or when the value of the type field of the second data control subframe is an acknowledged identifier, and the load field of the second data control subframe carries the sequence number that is of the first target data subframe and that corresponds to the acknowledged identifier, indicating, by the acknowledged identifier, that the target network device successfully receives the first frame.

5. The data transmission method according to claim 4, wherein the second frame further comprises a second target data subframe, a format of the second target data subframe is the same as a format of the first target data subframe, and the method further comprises:

replacing the second data control subframe in the second frame with a preamble field and a SFD field based on a frame format of a MAC layer, to obtain a MAC packet; and transmitting the MAC packet to the MAC layer for processing.

6. The data transmission method according to claim 4, wherein the second frame further comprises a second target data subframe, and the second data control subframe carries, by using the load field, a sequence number corresponding to the second target data subframe, the second data control subframe further comprises a header field used to indicate whether the source network device needs to feed back a receiving status of a second target data subframe to the target network device.

7. A data transmission method applied to a target network device, the data transmission method comprising:

receiving a first frame transmitted by a source network device, wherein the first frame comprises a first data control subframe and a first target data subframe, the first data control subframe is generated by using field space of a first field of a first media access control (MAC) packet obtained from an upper layer, the first target data subframe is generated based on a second field of the first MAC packet, the first data control subframe carries a sequence number corresponding to the first target data subframe and a header field, and a value of the header field of the first data control subframe is used to indicate whether the target network device needs to feed back a receiving status of the first target data subframe to the source network device;

parsing the first data control subframe to obtain the value of the header field; and when the value of the header field of the first data control subframe is a first identifier, setting a type field of a second data control subframe to a preset value; or when the value of the header field of the first data control subframe is a second identifier, determining whether the first frame is successfully received.

8. The data transmission method according to claim 7, wherein after receiving the first frame transmitted by the source network device, the method further comprises:

generating a second frame comprising the second data control subframe, and when the first frame is not successfully received, the second data control subframe carries a non-acknowledgement identifier by using the type field and carries, by using a load field, the sequence number that is of the first target data subframe and that corresponds to the non-acknowledgement identifier, or when the first frame is successfully received, the second data control subframe carries an acknowledged identifier by using the type field and carries, by using the load field, the sequence number that is of the first target data subframe and that corresponds to the acknowledged identifier; and transmitting the second frame to the source network device.

9. The data transmission method according to claim 8, wherein the second frame further comprises a second target data subframe, and the second data control subframe carries a sequence number of the second target data subframe by using the load field, and generating the second frame comprises:

obtaining a second MAC packet from a MAC layer, wherein the second MAC packet comprises a first field and a second field;

generating the second data control subframe by using a partial or an entire field space of the first field, and generating the second target data subframe based on the second field; and encapsulating the second data control subframe and the second target data subframe to obtain the second frame.

10. The data transmission method according to claim 7, wherein the first field comprises a preamble field and a start frame delimiter (SFD) field, the second field comprises a destination MAC address field, a source MAC address field, a type or length field, a payload field, and a frame check sequence field.

11. The data transmission method according to claim 7, wherein the first target data subframe comprises a first check field, the first data control subframe comprises a second check field, and the method further comprises:

verifying, by using the first check field, whether the first MAC packet has a bit error;

verifying, by using the second check field, whether the first data control subframe has a bit error; and when the first MAC packet has a bit error or the first data control subframe has a bit error, determining that the first frame is not successfully received.

12. The data transmission method according to claim 9, wherein the second frame further comprises a second target data subframe comprising a first check field, the second data control subframe comprises a second check field, a value of the first check field is used by the source network device to verify whether the second MAC packet has a bit error, and a value of the second check field is used by the source network device to verify whether the second data control subframe has a bit error.

13. A network device comprising:

a processor, a memory, and an Ethernet interface, wherein the processor, the memory, and the Ethernet interface are connected by using a bus, the memory is configured to store program instructions, which when executed by the processor, cause the network device to perform a method comprising:
obtaining a to-be-transmitted first media access control (MAC) packet comprising a first field and a second field;
generating a first frame comprising a first data control subframe obtained by using field space of the first field and a first target data subframe obtained based on the second field, and the first data control subframe comprises a sequence number of the first target data subframe and a header field used to indicate whether a target network device needs to feed back a receiving status of the first target data subframe to a source network device;
transmitting the first frame to the target network device; and
when a transmission level of the first target data subframe is a low priority, determining that the header field of the first data control subframe carries a first identifier used to indicate that the target network device does not need to feed back the receiving status of the first target data subframe to the source network device; or
when the transmission level of the first target data subframe is a high priority, determining that the header field of the first data control subframe carries a second identifier used to indicate that a target network device needs to feed back the receiving status of the first target data subframe to a source network device.

14. The network device according to claim 13, wherein the first field comprises a preamble field and a start frame delimiter (SFD) field, and generating the first frame comprises:
generating the first data control subframe by using a partial or an entire space of the preamble field and the SFD field, and generating the first target data subframe based on the second field; and
encapsulating the first data control subframe and the first target data subframe to obtain the first frame.

15. The network device according to claim 13, wherein the second field comprises a destination MAC address field, a source MAC address field, a type or length field, a payload field, and a frame check sequence field, wherein the first target data subframe further comprises a first check field, the first data control subframe further comprises a second check field, a value of the first check field is used by the target network device to verify whether the first MAC packet has a bit error, and a value of the second check field is used by the target network device to verify whether the first data control subframe has a bit error.

16. The network device according to claim 13, wherein after transmitting the first frame to the target network device, the method further comprises:
receiving a second frame transmitted by the target network device, wherein the second frame comprises a second data control subframe, and the second data control subframe comprises a type field and a load field;
parsing the second data control subframe, and identifying a value of the type field and a value of the load field;
when the value of the type field of the second data control subframe is a non-acknowledgement identifier, and the load field of the second data control subframe carries the sequence number that is of the first target data subframe and that corresponds to the non-acknowledgement identifier, fetching the first frame in a retransmission buffer based on the sequence number that is of the first target data subframe and that corresponds to the non-acknowledgement identifier; and
retransmitting the first frame to the target network device; or
when the value of the type field of the second data control subframe is an acknowledged identifier, and the load field of the second data control subframe carries the sequence number that is of the first target data subframe and that corresponds to the acknowledged identifier, indicating, by the acknowledged identifier, that the target network device successfully receives the first frame.

17. The network device according to claim 16, wherein the second frame further comprises a second target data subframe, a format of the second target data subframe is the same as a format of the first target data subframe, and the method further comprises:
replacing the second data control subframe in the second frame with a preamble field and a SFD field based on a frame format of a MAC layer, to obtain a MAC packet; and
transmitting the MAC packet to the MAC layer for processing.

* * * * *

UNITED STATES PATENT AND TRADEMARK OFFICE
CERTIFICATE OF CORRECTION

PATENT NO. : 12,368,534 B2  
APPLICATION NO. : 17/965916  
DATED : July 22, 2025  
INVENTOR(S) : Yuchun Lu et al.

Page 1 of 1

It is certified that error appears in the above-identified patent and that said Letters Patent is hereby corrected as shown below:

In the Claims

In Column 27, Claim 13, Line 27, delete "a target network" and insert --the target network--.

In Column 27, Claim 13, Line 29, delete "a source network" and insert --the source network--.

Signed and Sealed this  
Fourth Day of November, 2025

John A. Squires  
*Director of the United States Patent and Trademark Office*